US010221493B2

(12) United States Patent
Paatero et al.

(10) Patent No.: US 10,221,493 B2
(45) Date of Patent: Mar. 5, 2019

(54) METHOD FOR RECOVERY OF COPPER AND ZINC

(71) Applicant: OUTOTEC (FINLAND) OY, Espoo (FI)

(72) Inventors: Erkki Paatero, Helsinki (FI); Kari Hietala, Espoo (FI); Mika Haapalainen, Pori (FI)

(73) Assignee: OUTOTEC (FINLAND) OY, Espoo (FI)

( * ) Notice: Subject to any disclaimer, the term of this patent is extended or adjusted under 35 U.S.C. 154(b) by 258 days.

(21) Appl. No.: 15/111,987

(22) PCT Filed: Jan. 21, 2015

(86) PCT No.: PCT/FI2015/050031
§ 371 (c)(1),
(2) Date: Jul. 15, 2016

(87) PCT Pub. No.: WO2015/110702
PCT Pub. Date: Jul. 30, 2015

(65) Prior Publication Data
US 2016/0369417 A1    Dec. 22, 2016

(30) Foreign Application Priority Data

Jan. 22, 2014 (FI) ..................... 20145060

(51) Int. Cl.
| | |
|---|---|
| *C25C 1/12* | (2006.01) |
| *C22B 3/00* | (2006.01) |
| *C22B 15/00* | (2006.01) |
| *C22B 19/20* | (2006.01) |
| *C22B 3/42* | (2006.01) |
| *C22B 3/46* | (2006.01) |
| *C22B 3/26* | (2006.01) |

(52) U.S. Cl.
CPC ............. *C25C 1/12* (2013.01); *C22B 3/0005* (2013.01); *C22B 3/42* (2013.01); *C22B 3/46* (2013.01); *C22B 15/0063* (2013.01); *C22B 15/0089* (2013.01); *C22B 19/22* (2013.01); *C22B 19/26* (2013.01); *Y02P 10/234* (2015.11); *Y02P 10/236* (2015.11)

(58) Field of Classification Search
CPC ........... C25C 1/12; C22B 3/0005; C22B 3/42; C22B 3/46; C22B 15/0063; C22B 15/0089; C22B 19/22; C22B 19/26; Y02P 10/234; Y02P 10/236
See application file for complete search history.

(56) References Cited

U.S. PATENT DOCUMENTS

| | | | |
|---|---|---|---|
| 2,992,894 A | 7/1961 | Hazen et al. | |
| 3,973,949 A * | 8/1976 | Goens ..................... | C22B 19/20 205/369 |
| 4,362,607 A | 12/1982 | Ritcey et al. | |
| 4,423,012 A * | 12/1983 | Reynolds ............... | C01G 9/003 205/573 |
| 4,563,256 A * | 1/1986 | Sudderth ................ | C01G 3/003 205/581 |
| 4,971,662 A | 11/1990 | Sawyer et al. | |
| 5,868,935 A * | 2/1999 | Sirkar .................. | B01D 17/085 210/321.8 |
| 5,869,012 A | 2/1999 | Jones | |
| 2008/0245734 A1 | 10/2008 | Cheng et al. | |

FOREIGN PATENT DOCUMENTS

EP        0 301 783 A2    2/1989

OTHER PUBLICATIONS

International Search Report (PCT/ISA/210) dated May 19, 2015, by the European Patent Office as the International Searching Authority for International Application No. PCT/FI2015/050031.
Written Opinion (PCT/ISA/237) dated May 19, 2015, by the European Patent Office as the International Searching Authority for International Application No. PCT/FI2015/050031.
G. Kyuchoukov et al., "A novel method for recovery of copper from hydrochloric acid solutions", Hydrometallurgy, Dec. 1, 1991, pp. 361-369, vol. 27, No. 3.

* cited by examiner

*Primary Examiner* — Ciel P Thomas
(74) *Attorney, Agent, or Firm* — Buchanan, Ingersoll & Rooney PC

(57) ABSTRACT

The present invention provides a method of recovering copper and zinc from an aqueous sulfate and chloride containing solution. In the first process step zinc and copper are simultaneous extracting with an extraction solution comprising a liquid chelating cation exchanger and a liquid anion exchanger. The extraction is followed by consecutive stripping stages. First the anionic species are washed from the organic phase with one or more aqueous solutions and finally the copper is stripped with an aqueous acidic solution.

17 Claims, No Drawings

METHOD FOR RECOVERY OF COPPER AND ZINC

FIELD OF THE INVENTION

The present invention relates to a method of recovering of zinc and copper selectively from aqueous sulfate-chloride solutions by liquid-liquid extraction, in particular to selective stripping of zinc and copper.

BACKGROUND OF THE INVENTION

In conventional hydrometallurgical processes for the recovery of copper from sulfuric acid leach solutions copper is extracted utilizing solvent extraction with hydroxyoxime type reagents which extract the copper ion through a cation exchange reaction. The solvent extraction is followed by electrowinning of copper producing copper cathodes as the final product. However, in cases where the leach solution contains chlorides in addition to sulfates the chloride complexes are co-extracted when conventional method are used and thus cannot be easily removed from the resulting copper-containing solutions that should be subjected to copper electrowinning where the presence of chloride ions is not tolerated.

BRIEF DESCRIPTION OF THE INVENTION

It is thus an object of the present invention to provide a method and so as to overcome the above problems. The objects of the invention are achieved by a method which is characterized by what is stated in the independent claims. The preferred embodiments of the invention are disclosed in the dependent claims.

The invention is based on the idea of extracting copper and zinc simultaneously by liquid-liquid extraction. In the first process step zinc and copper are co-extracting with an extractant mixture consisting of a liquid chelating cation exchanger and a liquid anion exchanger base. The extraction is followed by consecutive stripping stages. First the anionic species are washed from the organic phase with one or more aqueous solutions and finally the copper is stripped with sulfuric acid.

DETAILED DESCRIPTION OF THE INVENTION

The present invention provides a method of recovering copper and zinc from an aqueous sulfate and chloride containing solution, comprising the steps of:

(a) providing an aqueous sulfate and chloride containing solution comprising copper and zinc;

(b) extracting the aqueous sulfate and chloride containing solution with an extraction solution comprising a liquid chelating cation exchanger and a liquid anion exchanger to obtain a loaded organic phase comprising zinc and copper and a first aqueous phase;

(c) washing zinc from the loaded organic phase with an aqueous solution to obtain a zinc-depleted organic phase and zinc and chloride containing second aqueous phase;

(d) stripping copper from the zinc depleted organic phase with an aqueous acidic solution to obtain a zinc and copper depleted organic phase and a copper containing third aqueous phase;

(e) recovering zinc from the zinc and chloride containing second aqueous phase and recovering copper from the copper containing third aqueous phase.

The present invention is particularly suitable for recovery of zinc and copper from aqueous solutions comprising both sulfate(s) and halide(s). The halides are typically present as chlorides. However, also bromides may be present and/or added to the aqueous solution. Such sulfate-halide solutions may be obtained e.g. from leaching of zinc and copper containing raw material with leaching agents containing sulfuric acid and HCl and/or using Cl containing process water together in process steps, in particular leaching step, preceding the recovery steps of the present invention. Such process water can for example be saline water obtained e.g. from sea or saline lakes. Chloride can also enter the process from the raw material, e.g. from atacamite mineral.

In an example of the present invention the chloride concentration of the aqueous sulfate and chloride containing solution comprising copper and zinc is from 1 to 175 g/L, preferably from 2 to 150 g/L, more preferably from 3 to 120 g/L. In a further example of the present invention the sulfate concentration of the aqueous sulfate and chloride containing solution comprising copper and zinc is from 30 to 300 g/L, preferably from 40 to 200 g/L.

Advantageously the aqueous sulfate and chloride containing solution further comprises bromides.

In accordance with the present invention the liquid chelating cation exchanger comprised in the extraction solution chelates the cationic copper in the organic phase. In a preferred example of the present invention the liquid chelating cation exchanger is hydroxyoxime. The hydroxyoxime can be either a ketoxime or an aldoxime. Examples of particularly suitable hydroxyoximes are orthohydroxyarylketoximes, orthohydroxyarylaldoximes and mixtures thereof. Both the ketoximes and the aldoximes are viable copper extraction agents. However, the aldoximes are more efficient than the ketoximes and they are more selective in respect of iron.

Ketoximes and aldoximes of the present invention preferably have the general formula (I)

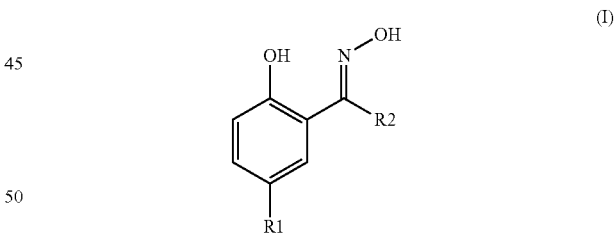

wherein R1 is $C_{8-15}$-alkyl and R2 is H, methyl or phenyl.

Further in accordance with the present invention the liquid anion exchanger comprised in the extraction solution extracts the anionic zinc into the organic phase. Typically the anionic zinc species is present as $ZnCl_3^-$. At high chloride concentrations also copper is present partly as chloro complexes such as $CuCl^+$ and $CuCl_2$ which are also extracted with the extraction solution.

The liquid anion exchanger is preferably a base or a mixture of bases, in particular one or more secondary amine(s) and/or one or more tertiary amine(s). The preferred liquid anion exchangers of the present invention have the general formula (II)

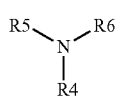

(II)

wherein R5 and R6 are each independently $C_{1-16}$-alkyl, preferably $C_{6-12}$-alkyl; and R3 is H (secondary amine) or $C_{1-16}$-alkyl, preferably $C_{6-12}$-alkyl, (tertiary amine).

In a suitable example of the present invention the amine is selected from the group consisting of n-lauryltrialkylmethylamine (Amberlite LA-2), n-dodecenyltrialkylmethylamine, tri-n-octylamine, tri-isooctylamine, tri-isodecylamine and trilaurylamine.

In the beginning of the extraction process the liquid anion exchanger is present in its basic form and receives the $H^+$-ion that is released as the liquid cation exchanger chelates the copper cation. It also acts as a pH buffer. With the liquid anion exchanger base of the present invention the requirement for adjusting the pH of the extraction stage with e.g. lime, caustic soda, soda ash, magnesium oxide, ammonia can be avoided or decreased. In that manner the neutralizing chemical does not end up in the raffinate.

The extraction solution is advantageously water immiscible. In typical example of the present invention the extraction solution consists of a liquid chelating cation exchanger, a liquid anion exchanger and a diluent. In a preferred example of the present invention the liquid chelating cation exchanger comprised in the extraction solution has the general formula (I) and the liquid anion exchanger has the general formula (II).

The concentration of the liquid chelating cation exchanger in the extraction solution is typically from 5 to 40 vol-% preferably from 10 to 35 vol-%. The concentration of the liquid anion exchanger in the extraction solution is typically from 1 to 30 vol-%. A hydrocarbon solvent commonly used in metal extraction is used as the diluent. If required, some modifier may be added to the organic phase in order to avoid third phase formation or to improve stripping. Typical modifiers are long chain alcohols, nonyl phenols and esters.

After copper and zinc have been simultaneously extracted in step (b) and an organic phase comprising zinc and copper has been obtained, zinc and copper can be selectively stripped and recovered from the said organic phase.

First zinc is washed or scrubbed from the organic phase with an aqueous solution to obtain a zinc depleted organic phase and zinc and chloride containing second aqueous phase. In an example of the present invention the aqueous solution in step (c) is water. In an alternative example of the present invention the aqueous solution in step (c) is a sulfate solution having pH higher than 2. At this stage also the chloride ions comprised in the organic phase are removed from the organic phase and also the copper that was extracted as chloro complex is complexed to the cation exchanger as $Cu^{2+}$. In an optional stage the organic phase can be further washed with diluted NaOH, $Na_2CO_3$ or ammonium solution. The remaining chloride in the organic phase is on such a low level that it allows the utilization of electrolytic recovery method for copper as such methods do not tolerate the presence of chloride ions.

Zinc can be recovered from the obtained zinc and chloride containing second aqueous phase by e.g. precipitation with soda ash to produce zinc carbonate. The resulting chloride containing aqueous solution can be returned to leaching.

Copper is stripped (d) from the zinc (and chloride) depleted organic phase with an aqueous acidic solution to obtain a zinc and copper depleted organic phase and a copper containing third aqueous phase. The aqueous acidic solution is preferably a sulfuric acid solution. In a preferred example of the present invention the aqueous acid solution is step (d) is an aqueous sulfuric acid solution containing more than 140 g/L, preferably 170 to 210 g/L, $H_2SO_4$. The aqueous sulfuric acid solution can also comprise copper sulfates. This allows the recycle of the copper stripping solution from copper electrowinning. A concentrated acid solution is required for removing the copper from the organic phase to the aqueous phase. In the electrowinning stage copper cathodes are produced by well known methods. In a typical example of the present invention copper is recovered in step (e) by copper electrowinning from the copper containing third aqueous phase and the resulting lean copper electrolyte is recycled to the stripping step (d) as a part of the aqueous acidic solution.

After the stripping steps (c) and (d) the zinc and copper depleted organic phase can be regenerated (f) by treating said zinc and copper depleted organic phase to obtain a regenerated organic solution by deprotonating the liquid anion exchanger. This is preferably achieved with an aqueous base solution that preferably has pH higher than 6.5, preferably from 7 to 9.5. Thus in an advantageous example of the present invention the method, the method further comprises the step of (f) regenerating the zinc and copper depleted organic phase with an aqueous solution containing a base that deprotonates the amine.

In a preferable example of the present invention the aqueous base solution can comprise a base selected from the group consisting of lime, caustic soda, soda ash, magnesium oxide, ammonia and any mixtures therefor, preferably caustic soda and/or soda ash. With the preferred bases the formation of precipitates can be avoided in the regeneration step (f). The regeneration of the organic phase allows it to be recycled to the extraction step (b).

Preliminary experiments were made with different combinations of ketoximes and aldoximes with different secondary and tertiary amines. The following extractants were used: BASF LIX® 84-I (2-hydroxy-5-nonylacetophenone oxime), Acorga® M5640 (5-nonylsalicylaldoxime), BASF LIX® 860 (5-dodecylsalicylaldoxime) BASF Alamine® 336 (tertiary amine) and Amberlite® LA-2 (secondary amine). It was found that all these reagents work according to the present innovation. The systematic experiments reported in the following examples were performed using BASF LIX® 860 and Amberlite® LA-2 reagents.

The complete process can utilize known contacting equipments such as mixer-settlers, columns, centrifuges, static mixers or stirred reactors. The metal extraction, the washing zinc and the stripping of copper may each take place in one or several stages. The process units can be operated in continuous or batch manner.

The main advantages of the invention compared to known methods are as follows:
Sulfate-chloride media can be utilized for leaching copper and zinc containing material such as ore, concentrates, recycled metal or waste.
Conventional sulfate electrowinning can be utilized to produce copper cathodes although the feed to the solvent extraction contains chloride.
The need of neutralization prior to solvent extraction is smaller and consequently the raffinate from the solvent extraction contains less rests of the neutralizing chemical.
The zinc can be recovered as a sellable product.
Chloride(s) can be returned to leaching.

EXAMPLES

Example 1

A test to demonstrate the effect of the amine type extractant on the simultaneous extraction of copper and zinc from a simulated leach solution was carried out in a 400-mL laboratory stirred reactor using two commercial extractants BASF LIX® 860 and Amberlite® LA-2 blended together. The concentration of LIX860 was kept the same 30 vol-% whereas the concentration of the amount of the amine extractant Amberlite LA-2 in free base form was varied between 0 and 20 vol-%. The organic diluent was Shellsol D-70 aliphatic hydrocarbon solvent. The aqueous feed contained 60 g/L Cu, 5 g/L Zn, 0.4 g/L Ca, 2 g/L Mg, and 2 g/L Pb in a solution containing 91 g/L chloride and 50 g/L sulfate anions. The extraction tests were made at the temperature of 22° C. using a phase volume ratio of 1:1 and mixing time of 30 min. The chloride and sulfate levels were adjusted with NaCl and $Na_2SO_4$ and the pH with NaOH. The extraction results are shown in Table 1.

TABLE 1

| Amine concentration | Extraction % | | | | | Equilibrium pH |
|---|---|---|---|---|---|---|
| | Cu | Zn | Ca | Mg | Pb | |
| 0% LA-2 | 35.2 | 9.7 | 9.2 | 9.6 | 3.0 | 0.3 |
| | 38.1 | 14.4 | 14.3 | 14.2 | 11.5 | 0.5 |
| | 39.5 | 11.2 | 11.9 | 16.0 | 8.5 | 0.6 |
| | 38.8 | 15.0 | 13.2 | 13.7 | 11.5 | 0.9 |
| | 41.4 | 16.4 | 18.4 | 17.8 | 12.5 | 1.2 |
| | 39.5 | 15.2 | 14.3 | 14.6 | 11.5 | 2.5 |
| 10% LA-2 | 24.3 | 10.5 | 2.2 | 0 | 0 | 0.3 |
| | 26.6 | 15.4 | 4.9 | 2.7 | 0 | 0.5 |
| | 33.1 | 27.2 | 5.7 | 8.7 | 3.5 | 0.9 |
| | 36.2 | 31.0 | 8.1 | 9.6 | 9.0 | 1.4 |
| | 38.4 | 36.9 | 10.0 | 10.0 | 6.0 | 1.9 |
| | 38.6 | 39.1 | 12.2 | 11.9 | 10.5. | 2.5 |
| 20% LA-2 | 22.8 | 42.2 | 0 | 0.5 | 0 | 0.5 |
| | 31.6 | 53.5 | 0.3 | 3.3 | 5.9 | 0.8 |
| | 37.6 | 64.1 | 6.5 | 8.1 | 7.8 | 1.3 |
| | 41.9 | 71.2 | 6.8 | 9.0 | 11.3 | 2.0 |
| | 42.4 | 72.3 | 5.9 | 1.410.4 | 14.2 | 2.5 |

The results show that the amine clearly increases the coextraction of zinc to the organic phase.

Example 2

Extraction tests were carried according to same experimental procedure as in Example 1 in order to follow the need to add neutralizing agent to control the aqueous phase pH during the extraction. The organic phase was like in Example 1 except that the concentration of LA-2 was varied between 0 and 30 vol-%.

Two different aqueous solutions were used as feeds to the extraction stage. The pH was adjusted with a 15% NaOH solution so that its consumption was recorded.

TABLE 2

Feed 1 (60 g/L Cu, 0 g/L Zn, 100 g/L chloride, 50 g/L sulfate, pH 2.5)

| Amine conc. | Extraction % | | Equilibrium pH | NaOH consumption for pH adj. (mL) |
|---|---|---|---|---|
| | Cu | Zn | | |
| 0% LA-2 | 32.0 | | 2.0 | 14 |
| 2% LA-2 | 33.5 | | 2.4 | 13 |
| 15% LA-2 | 35.2 | | 2.4 | 4 |
| 30% LA-2 | 33.9 | | 2.9 | 0 |

TABLE 3

Feed 2 (60 g/L Cu, 4.5 g/L Zn, 100 g/L chloride, 50 g/L sulfate, pH 2.5)

| Amine conc. | Extraction % | | Equilibrium pH | NaOH consumption for pH adj. (mL) |
|---|---|---|---|---|
| | Cu | Zn | | |
| 0% LA-2 | 34.9 | 0.6 | 2.6 | 14 |
| 2% LA-2 | 35.1 | 1.0 | 2.4 | 12 |
| 15% LA-2 | 33.1 | 56.2 | 2.4 | 5 |
| 30% LA-2 | 32.2 | 87.7 | 2.9 | 0 |

The results show that the amine reagent has a buffering effect and less base is needed to compensate the pH drop caused by the liberation of hydrogen ions during the cation exchange reaction between copper cation and hydroxyoxime molecule.

Example 3

Washing and stripping tests were carried out using the same experimental procedure, temperature, phase volume ratios and time as in the extraction tests in Example 1 in order to follow the co-extraction of chloride to the organic phase and to see how chloride is removed in the following wash and strip stages. Also the washing and stripping of Zn and Cu were studied. In this example the size of the reactor was 200 mL.

The loaded organic phases of Example 2 (Table 3 and Table 4) were treated in batches in three consequent wash stages: Wash 1 and Wash 2 were with pure water and Wash 3 was with an aqueous solution containing 100 g/L $Na_2SO_4$. Thereafter, the washed organic phase was stripped with 200 g/L sulfuric acid. The results are shown in Table 4 for the case that only copper was present in the loaded organic phase and in Table 5 for the case that copper and zinc are present. The aqueous metal ion and chloride concentrations in the tables are those analyzed at equilibrium.

TABLE 4

| Amine conc. | Loaded org. phase | Wash 1 aq. phase | | Wash 2 aq. phase | | Wash 3 aq. phase | | Stripping aq. phase | |
|---|---|---|---|---|---|---|---|---|---|
| | Cu g/L | Cu g/L | Cl g/L | Cu g/L | Cl g/L | Cu g/L | Cl g/L | Cu g/L | Cl g/L |
| 0% LA-2 | 18.2 | 0 | 0.49 | 0 | 0.002 | 0 | 0 | 14.0 | 0.011 |
| 2% LA-2 | 19.1 | 0.21 | 0.49 | 0.05 | 0.18 | 0.03 | 0.91 | 15.7 | 0.245 |
| 15% LA-2 | 20.1 | 0.73 | 1.2 | 0.16 | 0.32 | 0.26 | 3.77 | 18.2 | 3.164 |
| 30% LA-2 | 19.3 | n.d. | | | | | | | |

TABLE 5

| Amine conc. | Loaded org. phase Cu g/L | Loaded org. phase Zn g/L | Wash 1 aq. phase Cu g/L | Wash 1 aq. phase Zn g/L | Wash 1 aq. phase Cl g/L | Wash 2 aq. phase Cu g/L | Wash 2 aq. phase Zn g/L | Wash 2 aq. phase Cl g/L | Wash 3 aq. phase Cu g/L | Wash 3 aq. phase Zn mg/L | Wash 3 aq. phase Cl g/L | Stripping aq. phase Cu g/L | Stripping aq. phase Zn mg/L | Stripping aq. phase Cl g/L |
|---|---|---|---|---|---|---|---|---|---|---|---|---|---|---|
| 0% LA-2 | 19.9 | 0.03 | 0.23 | 0.02 | 0.63 | 0 | 0 | 0.02 | 0 | 5.6 | 0 | 13.9 | 0 | 0 |
| 2% LA-2 | 20.0 | 0.05 | n.d | | | | | | | | | | | |
| 15% LA-2 | 18.9 | 2.67 | 0.57 | 2.62 | 3.77 | 0.17 | 0.10 | 0.45 | 0.29 | 7 | 3.7 | 18.7 | 3 | 3.15 |
| 30% LA-2 | 18.4 | 4.16 | 0.93 | 3.44 | 5.27 | 0.22 | 0.73 | 1.22 | 0.41 | 44 | 5.0 | 16.6 | 2 | 5.18 |

The results in Table 5 show that zinc can be selectively washed from the oxime-amine extractant mixtures as zinc chloride by water. Copper is effectively stripped with the 200 g/L sulfuric acid. Some chloride follows the copper ion to the resulting sulfuric acid solution, but its chloride concentration is less than 10% of the chloride concentration in the feed solution. The example shows that the principles presented in this innovation enables the separation of copper and zinc and a decrease in the chloride concentration in the final copper sulfate solution enabling the use of sulfate electrowinning of copper. It is obvious that the reagent composition and process details must to be optimized for different needs.

It will be obvious to a person skilled in the art that, as the technology advances, the inventive concept can be implemented in various ways. The invention and its embodiments are not limited to the examples described above but may vary within the scope of the claims.

The invention claimed is:

1. A method of recovering copper and zinc from an aqueous sulfate and chloride containing solution, comprising the steps of:
   (a) providing an aqueous sulfate and chloride containing solution comprising copper and zinc;
   (b) extracting the aqueous sulfate and chloride containing solution with an extraction solution comprising a liquid chelating cation exchanger and a liquid anion exchanger to obtain a loaded organic phase comprising zinc and copper and a first aqueous phase;
   (c) washing zinc from the loaded organic phase with an aqueous solution to obtain a zinc-depleted organic phase and zinc and chloride containing second aqueous phase;
   (d) stripping copper from the zinc-depleted organic phase with an aqueous acidic solution to obtain a zinc and copper depleted organic phase and a copper-containing third aqueous phase;
   (e) recovering zinc from the zinc and chloride containing second aqueous phase and recovering copper from the copper containing third aqueous phase.

2. The method as claimed in claim 1, wherein the chloride concentration of the aqueous sulfate and chloride containing solution comprising copper and zinc is from 1 to 175 g/L.

3. The method as claimed in claim 1, wherein the sulfate concentration of the aqueous sulfate and chloride containing solution comprising copper and zinc is from 40 to 300 g/L.

4. The method as claimed in claim 1, wherein the liquid chelating cation exchanger is hydroxyoxime.

5. The method as claimed in claim 4, wherein the hydroxyoxime is selected from orthohydroxyarylketoximes, orthohydroxyarylaldoximes, and mixtures thereof.

6. The method as claimed in claim 1, wherein the liquid anion exchanger is a secondary amine.

7. The method as claimed in claim 1, wherein the liquid anion exchanger is a tertiary amine.

8. The method as claimed in claim 1, wherein the liquid anion exchanger is selected from the group consisting of n-lauryltrialkylmethylamine, n-dodecenyltrialkylmethylamine, tri-n-octylamine, tri-iso-octylamine, tri-iso-decylamine, and trilaurylamine.

9. The method as claimed in claim 1, wherein the concentration of the liquid chelating cation exchanger is from 5 to 40 vol-% and concentration of the liquid anion exchanger is from 1 to 30 vol-%.

10. The method as claimed in claim 1, wherein the aqueous solution in step (c) is water.

11. The method as claimed in claim 1, wherein the aqueous solution in step (c) is a sulfate solution having pH higher than 2.

12. The method as claimed in claim 1, wherein zinc is recovered from the zinc and chloride containing second aqueous phase by precipitation with soda ash.

13. The method as claimed in claim 1, wherein the aqueous acidic solution in step (d) is a sulfuric acid solution containing more than 140 g/L of $H_2SO_4$.

14. The method as claimed in claim 1, wherein copper is recovered in step (e) by copper electrowinning from the copper containing third aqueous phase and the resulting lean copper electrolyte is recycled to the stripping step (d) as a part of the aqueous acidic solution.

15. The method as claimed in claim 1, wherein the method further comprises the step of:
   (f) regenerating the zinc and copper depleted organic phase by treating said zinc and copper depleted organic phase with an aqueous base solution to obtain a regenerated organic solution.

16. The method as claimed in claim 15, wherein the aqueous base solution comprises a base selected from the group consisting of lime, caustic soda, soda ash, magnesium oxide, ammonia and mixtures thereof.

17. The method as claimed in claim 15, wherein the regenerated organic solution is recycled to the extraction step (b) as a part of the extraction solution.

* * * * *